(12) United States Patent
Charles et al.

(10) Patent No.: US 12,216,526 B2
(45) Date of Patent: Feb. 4, 2025

(54) MULTI-PATH LAYER CONFIGURED FOR PROACTIVE PATH STATE CHANGES

(71) Applicant: Dell Products L.P., Round Rock, TX (US)

(72) Inventors: Peniel Charles, Bangalore (IN); Manikandan Sethuraman, Bangalore (IN); Amudha Krishnasamy, Bangalore (IN); Venkata Adireddy Padala, Shrewsbury, MA (US); Vighneshwar Hegde, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 18/122,206

(22) Filed: Mar. 16, 2023

(65) Prior Publication Data

US 2024/0311017 A1 Sep. 19, 2024

(51) Int. Cl.
*G06F 11/00* (2006.01)
*G06F 3/06* (2006.01)
(Continued)

(52) U.S. Cl.
CPC ........ *G06F 11/0745* (2013.01); *G06F 3/0619* (2013.01); *G06F 3/0635* (2013.01);
(Continued)

(58) Field of Classification Search
CPC ............. G06F 11/0745; G06F 11/0709; G06F 11/1625; G06F 11/2023; G06F 11/2002;
(Continued)

(56) References Cited

U.S. PATENT DOCUMENTS 6,567,397 B1 5/2003 Campana, Jr. et al.
6,687,746 B1 2/2004 Shuster et al.
(Continued)

FOREIGN PATENT DOCUMENTS

CN 103677927 B 2/2017
EP 1117028 A2 7/2001
EP 2667569 A1 11/2013

OTHER PUBLICATIONS

International Search Report and Written Opinion of PCT/US2019/052549 dated Dec. 4, 2019, 13 pages.
(Continued)

*Primary Examiner* — Joseph D Manoskey
(74) *Attorney, Agent, or Firm* — Ryan, Mason & Lewis, LLP

(57) ABSTRACT

An apparatus comprises a processing device configured to identify, for a given path interconnecting a given host device and a storage system, a set of two or more checkpoints characterizing health of the given path. The processing device is also configured to generate health predictions for each checkpoint in the identified set of two or more checkpoints, and to determine whether any of the generated health predictions indicates an expected date of failure within a designated period of time. The processing device is further configured, responsive to determining that at least one of the generated health predictions indicates an expected date of failure within the designated period of time, to proactively update the connection state of the given path in a given multi-path input-output driver of the given host device.

20 Claims, 10 Drawing Sheets

(51) Int. Cl.
*G06F 11/07* (2006.01)
*G06F 11/16* (2006.01)
*G06F 11/30* (2006.01)

(52) U.S. Cl.
CPC .......... *G06F 3/067* (2013.01); *G06F 11/1625* (2013.01); *G06F 11/3041* (2013.01)

(58) Field of Classification Search
CPC ............... G06F 11/2007; G06F 11/201; G06F 11/3006; G06F 11/3027; G06F 11/3041; G06F 3/0619; G06F 3/0635; G06F 3/067
See application file for complete search history.

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,936,335 B2 | 3/2021 | Mallick et al. |
| 10,949,104 B2 | 3/2021 | Marappan et al. |
| 10,996,879 B2 | 5/2021 | Gokam |
| 11,016,699 B2 | 5/2021 | Anchi et al. |
| 11,016,783 B2 | 5/2021 | Rao et al. |
| 11,044,313 B2 | 6/2021 | Patel et al. |
| 11,044,347 B2 | 6/2021 | Kumar et al. |
| 11,050,660 B2 | 6/2021 | Rao et al. |
| 11,093,155 B2 | 8/2021 | Anchi et al. |
| 11,106,381 B2 | 8/2021 | Rao et al. |
| 11,126,358 B2 | 9/2021 | Kumar et al. |
| 11,126,363 B2 | 9/2021 | Tidke et al. |
| 11,157,203 B2 | 10/2021 | Gokam et al. |
| 11,366,771 B2 | 6/2022 | Smith et al. |
| 11,615,340 B2 | 3/2023 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0225911 A1* | 11/2004 | Smith ................. G06F 11/2257 714/47.3 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0233494 A1* | 9/2012 | Sandstrom .......... G06F 11/0727 714/E11.073 |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2023/0297453 A1* | 9/2023 | Viclizki ................. G06F 11/004 714/47.2 |
| 2024/0039856 A1* | 2/2024 | Kakko-Chiloff .... H04L 41/5025 |

OTHER PUBLICATIONS

International Search Report and Written Opinion of PCT/US2019/053204 dated Dec. 16, 2019, 40 pages.
International Search Report and Written Opinion of PCT/US2019/053473 dated Dec. 19, 2019, 16 pages.
International Search Report and Written Opinion of PCT/US2019/067144 dated May 4, 2020, 26 pages.
Kris Piepho, "Dell EMC SC Series Storage: Microsoft Multipath I/O," Dell EMC Best Practices, Jan. 2017, 57 pages.
NVM Express, "Nvm Express, Revision 1.3," NVM Express, May 1, 2017, 282 pages.
VMware, "Multipathing Configuration for Software ISCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.

(56) References Cited

OTHER PUBLICATIONS

EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: ISCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.
Dell Technologies, "Dell Connectrix Fibre Channel Storage Networking," Data Sheet, L914, Mar. 2023, 5 pages.
Dell EMC, "A Proactive Monitoring and Analytics Application for Dell EMC™ Storage Systems," CloudIQ Detailed Review White Paper, Jun. 2019, 63 pages.

\* cited by examiner

```
content values updated
   {
        Host Name : HOST_NAME
        Initiator WWN : WWN_1
        Initiator Switch Name : SWITCH_NAME_1
        Check point 1 – Initiator Switch Status : Good
        Initiator Switch Port : PORT_ID_1
        Check point 2 – Port Status : Online
        Array S1 Number : ARRAY_NUMBER
        Array Target Port WWN : WWN_2
        Array Target Port : PORT_ID_2
        Array Switch Name : SWITCH_NAME_2
        Check point 3 – Array Switch Status : Good
        Array Port : PORT_ID_3
        Check point 4 – Array Port Status : Online
        Prediction Failure Date : Nov 16, 2022
        Diagnose :
   }
```

```
content values updated
    {
        Host Name : HOST_NAME
        Initiator WWN : WWN_1
        Initiator Switch Name : SWITCH_NAME_1
        Check point 1 – Initiator Switch Status : Good
        Initiator Switch Port : PORT_ID_1
        Check point 2 – Port Status : Online
        Array S1 Number : ARRAY_NUMBER
        Array Target Port WWN : WWN_2
        Array Target Port : PORT_ID_2
        Array Switch Name : SWITCH_NAME_2
        Check point 3 – Array Switch Status : Good
        Array Port : PORT_ID_3
        Check point 4 – Array Port Status : Offline
        Prediction Failure Date : Nov 16, 2022
        Diagnose :
    }
```

FIG. 5

MULTI-PATH LAYER CONFIGURED FOR PROACTIVE PATH STATE CHANGES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments of the present disclosure provide techniques for configuring a multi-path layer to perform proactive path state changes in multi-path input-output drivers of host devices connected to a storage array or other type of storage system.

In one embodiment, an apparatus comprises at least one processing device comprising a processor coupled to a memory. The at least one processing device is configured to identify, for a given path interconnecting a given host device and a storage system, a set of two or more checkpoints characterizing health of the given path. The at least one processing device is also configured to generate health predictions for each checkpoint in the identified set of two or more checkpoints, and to determine whether any of the generated health predictions indicates an expected date of failure within a designated period of time. The at least one processing device is further configured, responsive to determining that at least one of the generated health predictions indicates an expected date of failure within the designated period of time, to proactively update the connection state of the given path in a given multi-path input-output driver of the given host device.

These and other illustrative embodiments include, without limitation, methods, apparatus, networks, systems and processor-readable storage media.

BRIEF DESCRIPTION OF THE DRAWINGS

FIG. 4 shows a connection state for a non-failing path between a host device and a storage array in an illustrative embodiment.

FIG. 5 shows a connection state for a failing path between a host device and a storage array in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
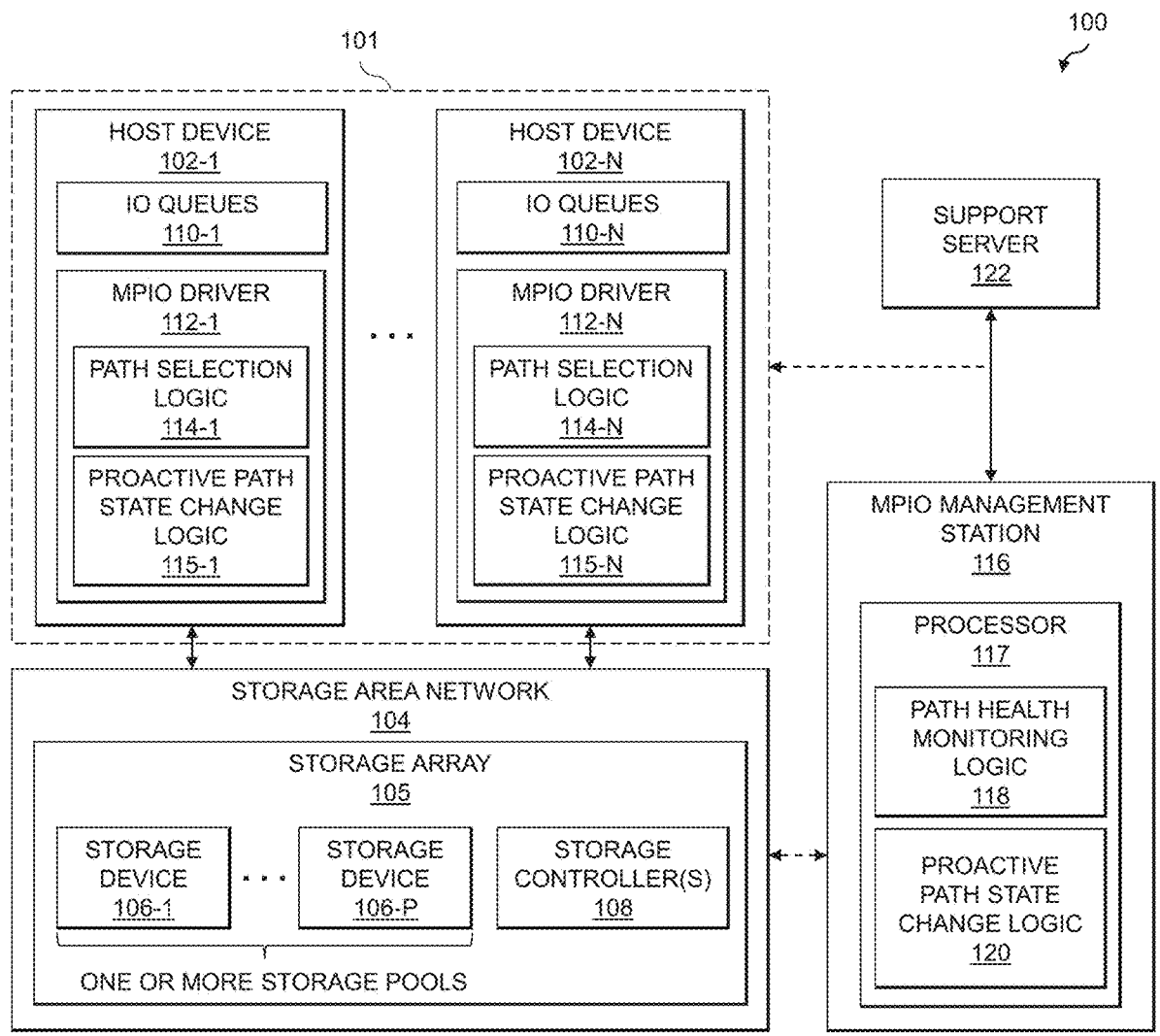
FIG. 1 is a block diagram of an information processing system configured for proactive path state changes in multi-path input-output drivers in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N (collectively, host devices 102), where N is an integer greater than or equal to two. The host devices 102 communicate over a storage area network (SAN) 104 with at least one storage array 105. The storage array 105 comprises a plurality of storage devices 106-1, . . . 106-P (collectively, storage devices 106) each storing data utilized by one or more applications running on one or more of the host devices 102, where P is also an integer greater than or equal to two. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N (collectively, IO queues 110) and respective MPIO drivers 112-1, . . . 112-N (collectively, MPIO drivers 112). The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N (collectively, path selection logic 114) implemented within the MPIO drivers 112.

The MPIO drivers 112 may comprise, for example, otherwise conventional MPIO drivers, such as PowerPathR drivers from Dell Technologies, suitably modified in the manner disclosed herein to provide functionality for dynamic control of one or more path selection algorithms. Other types of MPIO drivers from other driver vendors may be suitably modified to incorporate functionality for dynamic control of one or more path selection algorithms as disclosed herein.

The term "MPIO driver" as used herein is intended to be broadly construed, and such a component is illustratively implemented at least in part as a combination of software and hardware. For example, one or more of the MPIO drivers 112 can comprise one or more software programs running on a hardware processor of one or more of the host devices 102.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing path health monitoring logic 118 and proactive path state change logic 120. The MPIO management station 116 is configured to communicate with the host devices 102 and the storage array 105. The path health monitoring logic 118 is configured to monitor information characterizing the status of different paths between the host devices 102 and the storage array 105 over the SAN 104. Such information may include information for various "checkpoints" in a particular path between an initiator port on one of the host device 102 and a target port on the storage array 105. This may include, for example, whether the initiator and target ports are online/offline. The checkpoints may also include status information of switches interconnecting the initiator and target ports (e.g., including switch port status of the switch ports of the switches interconnecting the initiator and target ports). The path health monitoring logic 118 may utilize such information for proactively determining when particular paths are predicted to fail. Such determinations may be based at least in part utilizing a support server 122 (e.g., a cloud-based support service, such as Dell CloudIQ). When the path health monitoring logic 118 determines that one or more checkpoints of a given path are failing, this triggers the proactive path state change logic 120 to mark the given path as "standby" prior to the given path actually failing. The change in path state may be updated in the host device 102 via respective instances of proactive path state change logic 115-1, . . . 115-N (collectively, proactive path state change logic 115) implemented by the MPIO drivers 112.

Communication between the MPIO drivers 112 and the MPIO management station 116 may utilize one or more representational state transfer (REST) application programming interfaces (APIs) of the MPIO drivers 112. The MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate. The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1G, 2G, 4G, 8G, 16G, 32G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine IO processing performance for each of at least a subset of the paths, and to dynamically adjust a path selection algorithm, utilized by the path selection logic 114-1 in selecting particular ones of the paths for delivery of the IO operations from the host device 102-1 to the storage array 105, based at least in part on the determined performance.

In determining IO processing performance of respective paths, the MPIO driver 112-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage array 105 based at least in part on the determined performance is illustratively repeated in each of a plurality of intervals. The particular duration of such time periods can be a user-configurable parameter, or set by default, and can vary depending upon factors such as the desired resolution of the IO processing performance information and the amount of overhead required to determine that information.

In the FIG. 1 embodiment, the storage array 105 comprises one or more storage controllers 108. The storage controllers 108 may maintain per-port IO processing information. Such per-port IO processing information is illustratively collected by the storage array 105, and in some embodiments may be provided to one or more of the host devices 102 for use in conjunction with path selection.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPathR Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate logical storage device access as disclosed herein.

It should be noted that various logic components (e.g., path selection logic 114, proactive path state change logic 115, path health monitoring logic 118, proactive path state change logic 120, etc.) disclosed herein can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 108 has a different local cache or a different allocated portion of a global cache associated therewith, although numerous alternative arrangements are possible. The storage controllers 108 can be implemented as respective storage processors, directors or other storage system components configured to control storage system operations relating to processing of IO operations.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing functionality. Such conventional multi-pathing functionality is suitably modified in illustrative embodiments disclosed herein to support proactive path state change functionality.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Base Specification, Revision 2.0b, Jan. 6, 2022, which is incorporated by reference herein. Other NVMe storage access protocols of this type that may be utilized in illustrative embodiments disclosed herein include NVMe/FC, NVMeoF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more PowerMax™ storage arrays, commercially available from Dell Technologies. Numerous other types of storage arrays can be used in other embodiments.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

Additional examples of processing platforms utilized to implement portions of the system 100 in illustrative embodiments will be described in more detail below in conjunction with FIGS. 8 and 9.

Although not explicitly shown in FIG. 1, one or more input-output devices such as keyboards, displays or other types of input-output devices may be used to support one or more user interfaces to the MPIO management station 116, as well as to support communication between the MPIO management station 116 and other related systems and devices not explicitly shown.

It is to be appreciated that these and other features of illustrative embodiments are presented by way of example only, and should not be construed as limiting in any way. Accordingly, different numbers, types and arrangements of system components such as support server 122, host devices 102, SAN 104, storage array 105, storage devices 106, sets of IO queues 110, MPIO drivers 112 (including their corresponding instances of path selection logic 114 and proactive path state change logic 115), MPIO management station 116, processor 117, path health monitoring logic 118 and proactive path state change logic 120, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process for performing proactive path state changes in MPIO drivers will now be described in more detail with reference to the flow diagram of FIG. 2. It is to be understood that this particular process is only an example, and that additional or alternative processes for performing proactive path state changes in MPIO drivers may be used in other embodiments.

In this embodiment, the process includes steps 200 through 206. The FIG. 2 process is assumed to be performed by the MPIO management station 116 utilizing the path health monitoring logic 118 and the proactive path state change logic 120. As noted above, the MPIO management station 116 may comprise a management appliance (e.g., a PPMA) configured to manage MPIO drivers 112 of the host devices 102 providing respective production hosts in a data center. The FIG. 2 process begins with step 200, identifying, for a given path interconnecting a given one of the host devices 102 (e.g., host device 102-1) and a storage system (e.g., the storage array 105), a set of two or more checkpoints characterizing health of the given path. The set of two or more checkpoints may comprise an initiator HBA port of the host device 102-1, a target port of the storage array 105, and one or more switch ports interconnecting the initiator HBA port of the host device 102-1 and the target port of the storage array 105. The one or more switch ports interconnecting the initiator HBA port of the host device 102-1 and the target port of the storage array 105 may comprise a first switch port of a first switch that the initiator HBA port of the host device 102-1 is connected to, a second switch port of a second switch that the target port of the storage array 105 is connected to, and one or more inter-switch layer (ISL) ports interconnecting the first switch and the second switch.

In step 202, health predictions are generated for each checkpoint in the identified set of two or more checkpoints. The generated health prediction for a given one of the checkpoints in the identified set of two or more checkpoints may comprise a failure prediction state of a given port used in the given path interconnecting the host device 102-1 and the storage array 105. The failure prediction state may be based at least in part on determining whether a forecast transmit power of the given port drops below a minimum transmit power required for the given port within the designated period of time, whether the forecast transmit power of the given port transitions from a working zone to a failure zone within the designated period of time, etc. The given port may comprise a Small Form Factor Pluggable (SFP) port. In some embodiments, step 202 includes initiating a representational state transfer (REST) application programming interface (API) call to a server (e.g., support server 122) external to the data center, the REST API call specifying a first World Wide Name (WWN) identifier of an initiator HBA port of the host device 102-1 and a second WWN identifier of a target port of the storage array 105 for the given path and receiving, from the server in response to the REST API call, health failure reports for each of the checkpoints in the identified set of two or more checkpoints. The server external to the data center may comprise a cloud-based storage analytics service.

Figure 2:
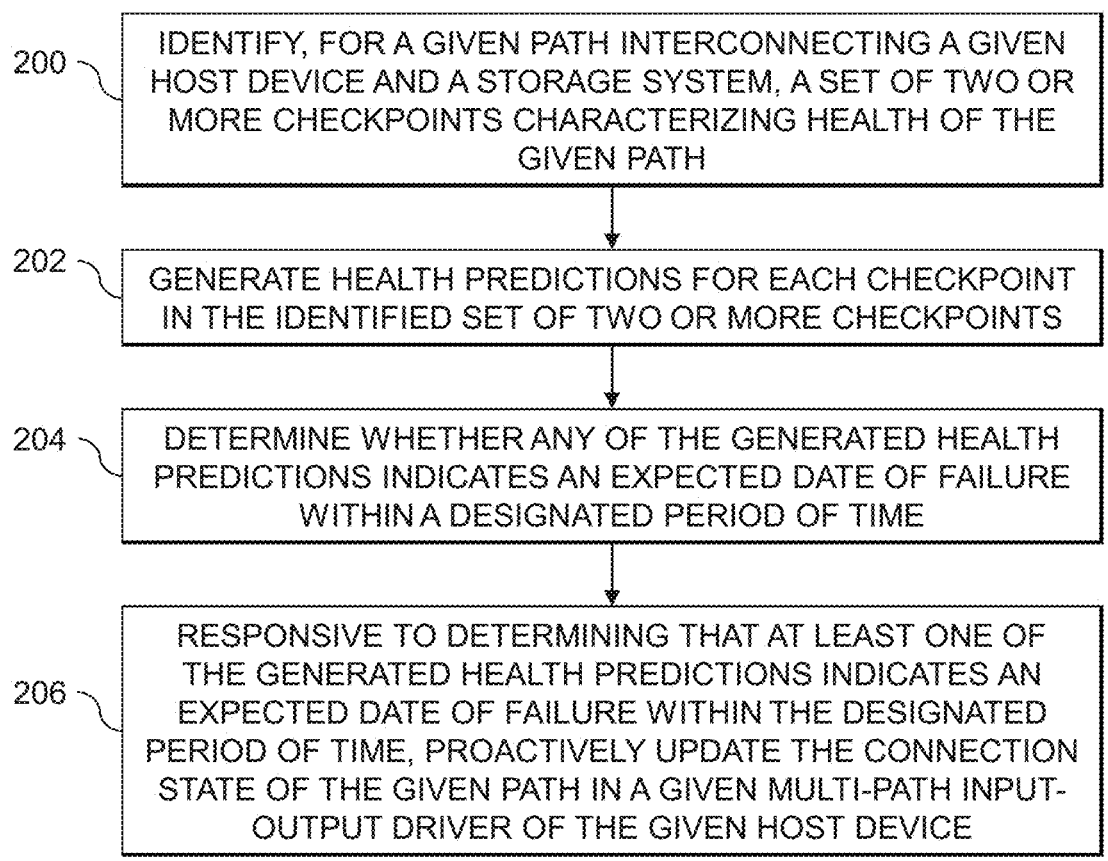
FIG. 2 is a flow diagram of an exemplary process for performing proactive path state changes in multi-path input-output drivers in an illustrative embodiment.

The FIG. 2 process continues with step 204, determining whether any of the generated health predictions indicates an expected date of failure within a designated period of time. In step 206, responsive to determining that at least one of the generated health predictions indicates an expected date of failure within the designated period of time, the connection state of the given path in the MPIO driver 112-1 of the host device 102-1 is proactively updated. Step 206 may comprise setting the connection state of the given path to a standby state, performing failover of the given path to at least one other path between the host device 102-1 and the storage array 105, setting the connection state of the given path to one which avoids input-output retries on the given path, setting the connection state of the given path to one which avoids input-output timeouts on the given path, etc.

MPIO drivers and other types of multi-pathing software (e.g., Dell PowerPathR) may not be configured with any predictive failure mechanisms. Thus, IO failover mechanisms for MPIO drivers typically utilize a reactive approach. On detecting actual path failure, an MPIO driver will intercept all failed IO requests, and retry them on available non-failed paths. Retrying IO requests after path failures, however, causes IO penalties and can impact application performance.

Illustrative embodiments provide technical solutions for detecting failing paths in advance of actual failure (e.g., using cloud-based prediction algorithms, such as Dell CloudIQ Optics Prediction), and for proactively making necessary path state changes for paths which are predicted to fail. Thus, IO failures and retries can be avoided when there are failures. Such failures may be predicted by considering optics failures, or disruptions in signals encoded in light transmitted over communication networks such as fiber optic links between ports on host devices, switches, inter-switch links and storage systems. In some embodiments, optic failures include detecting Small Form Factor Pluggable (SFP) optic failures (e.g., for SFP ports of host devices, switches and storage arrays which are interconnected via a plurality of paths). In some embodiments, a management appliance (e.g., PPMA) uses a prediction algorithm to detect failing SFP ports in advance, and makes necessary path state changes for corresponding paths. This advantageously avoids IO retries when SFP ports fail abruptly.

In some embodiments, the MPIO management station 116 will send bus identifier details for each of the host devices 102 having a corresponding MPIO driver 112 installed to the support server 122 (e.g., which may be a cloud-based system or service, such as Dell CloudIQ). The support server 122 may implement a MPIO data processor microservice (e.g., for processing data from the MPIO management station 116). The bus identifier details will include initiator World Wide Name (WWN) and array target WWN details (e.g., for different paths connecting the host devices 102 to the storage array 105 over the SAN 104). An internal application programming interface (API) may be used by the MPIO data processor microservice to communicate with a switch data processor microservice also implemented by the support server 122 to identify checkpoints between the requested initiator and target ports identified by the initiator and array target WWN details. These checkpoints are used for building end-to-end connection state information.

Figure 3:
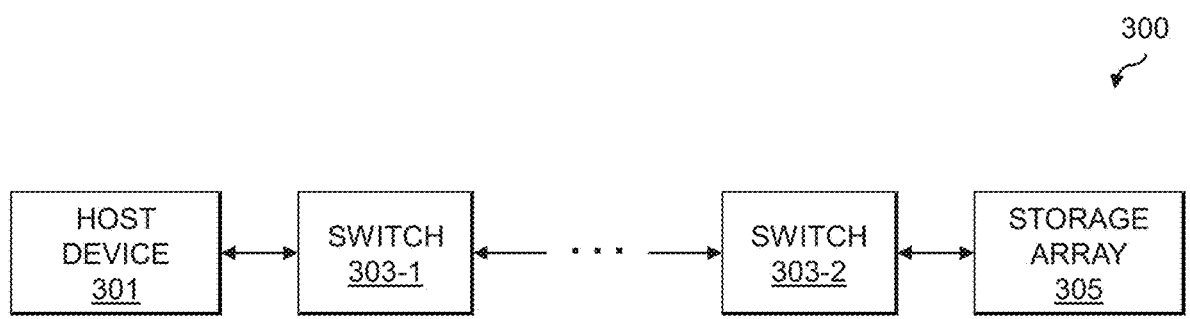
FIG. 3 shows a path between a host device and a storage array in an illustrative embodiment.

FIG. 3 shows an example end-to-end path 300 between a host device 301 and a storage array 305 connected via switches 303-1 and 303-2. The end-to-end path 300 includes the switch 303-1 where the HBA of the host device 301 is connected, the specific port on the switch 303-1 where the HBA of the host device 301 is connected, Inter-Switch Link (ISL) port information between the switch 303-1 and the switch 303-2 (e.g., the switch on the next hop), the port on the switch 303-2 to which the storage array 305 target port is connected, etc.

FIG. 4 shows an example 400 listing of content values which may be included in a connection state for the end-to-end path 300. Such content values include: a host name (e.g., of host device 301); an initiator WWN (e.g., of the switch 303-1); an initiator switch name (e.g., of the switch 303-1); a first checkpoint (e.g., a status of the switch 303-1); an initiator switch port (e.g., the port of the switch 303-1 that a HBA of the host device 301 is connected to); a second checkpoint (e.g., a status of the port of the switch 303-1 that the HBA of the host device 301 is connected to); an array number or identifier (e.g., of the storage array 305); an array target port WWN (e.g., of the switch 303-2); an array target port (e.g., the port of the switch 303-2 which connects to the storage array 305); array switch information (e.g., of the switch 303-2 connected to the storage array 305); a fourth checkpoint (e.g., a status of the switch 303-2); an array port identifier (e.g., of the target port of the storage array 305) and a fourth checkpoint (e.g., a status of the target port of the storage array 305). The connection details further indicate a predicted failure date for the end-to-end path 300 between the host device 301 and the storage array 305, and diagnosis information.

The MPIO management station 116 can initiate an API call (e.g., a public representational state transfer (REST) API call) to the support server 122 with the bus details (e.g., the initiator and target port WWN details) to validate all ports' SFP failure predictions. In some embodiments, the MPIO management station 116 is configured to initiate this API call on a set or periodic interval (e.g., every 12 hours, every 24 hours, etc.). The support server 122 will then verify failure prediction state for all the checkpoints (e.g., as detailed in the example 400 of FIG. 4). If any SFP health failure is reported as deteriorating and expected to fail (e.g., in a week), then an expected date of failure is returned. Details of the component (or components) with deteriorating health are sent back to the MPIO management station 116 as a response to the API call. FIG. 5 shows an example of updated connection details 500, where the checkpoint 4 indicates that the target storage array port (e.g., of the storage array 305) is offline. The MPIO management station 116 can use these details to proactively mark the end-to-end path 300 "standby" which will avoid any IO retries or timeouts on the end-to-end path 300.

Figure 6A:
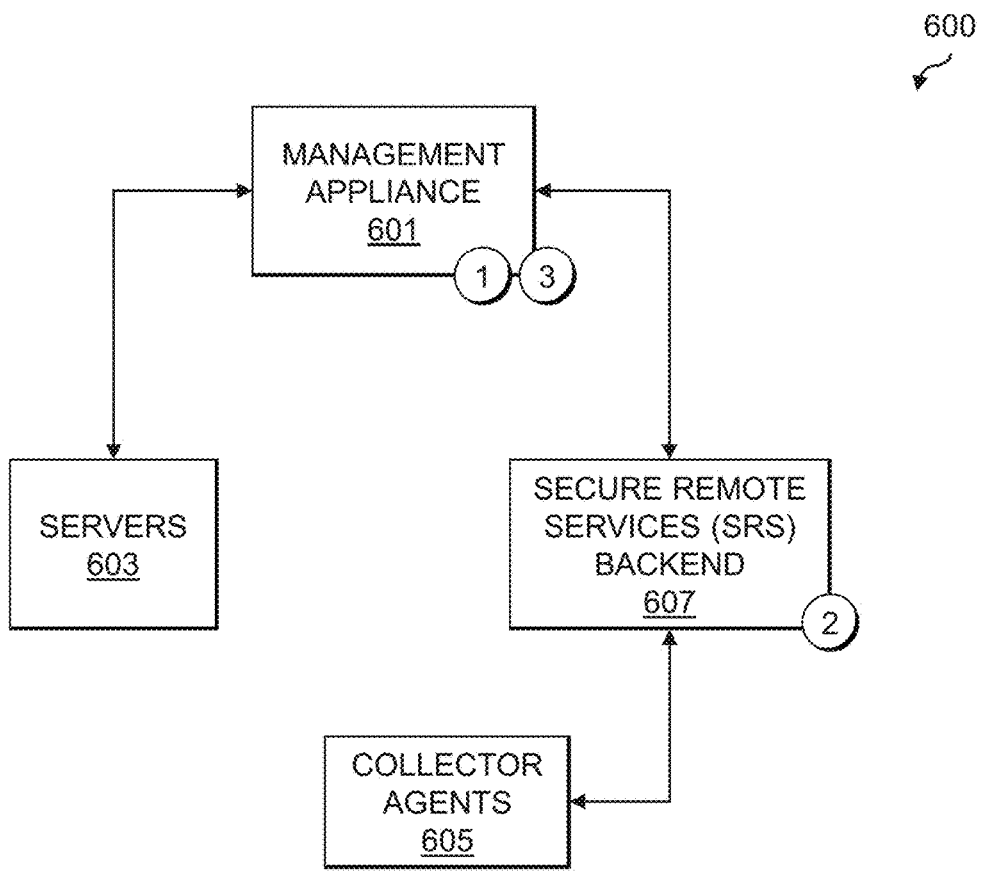
FIGS. 6A and 6B show a system configured for proactive path state management in an illustrative embodiment.

FIG. 6A shows a system 600 configured for proactive path state management, including a management appliance 601 (e.g., MPIO management station 116), a set of servers 603 (e.g., host devices 102, storage array 105), a set of collector agents 605, and a secure remote services (SRS) backend 607 (e.g., support server 122). The management appliance 601 is configured to communicate with the servers 603 to obtain monitoring or status information therefrom (e.g., connection details for various paths). Such information may be reported from the management appliance 601 to the SRS backend 607. The SRS backend 607 is also in communication with the set of collector agents 605, which may run on or be associated with switches that interconnect the servers 603. In some embodiments, the switches may comprise Connectrix switches (e.g., Fibre Channel directors and switches) on which Dell CloudIQ Collector applications implementing the collector agents 605 run.

The management appliance 601 in step 1 periodically triggers an API call (e.g., a REST API call) to the SRS backend 607 to check on health predictions. In step 2, the SRS backend 607 queries (e.g., in the different paths interconnecting the servers 603) health predictions for each of the checkpoints, reports back any ports or other components which are predicted to fail (e.g., along with their predicted failure dates) to the management appliance 601. In step 3, the management appliance 601 uses the health predictions to gracefully mark paths associated with failing ports to a "standby" state before their predicted failure times. This advantageously avoids IO failures and retries.

Figure 6B:
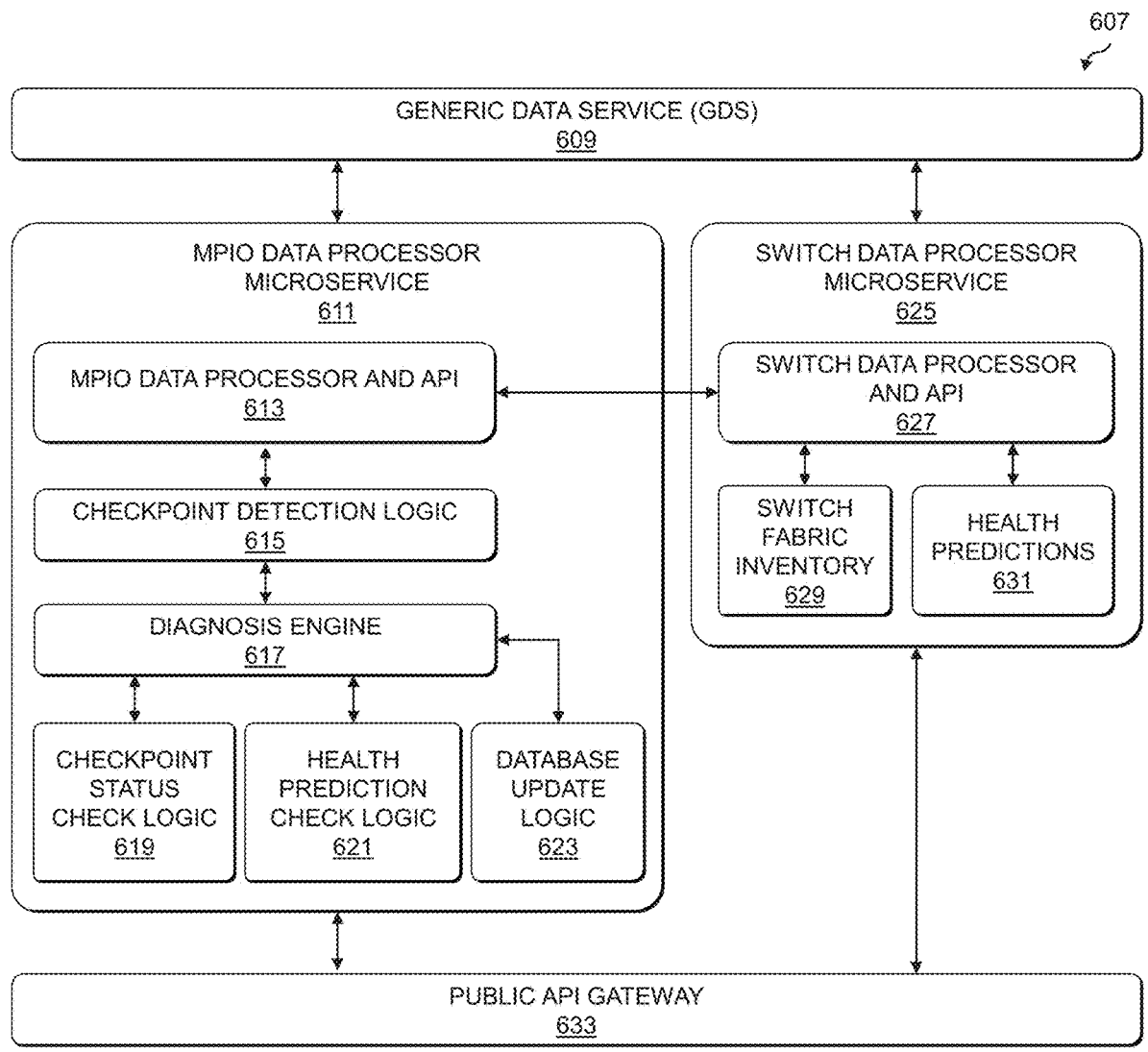

FIG. 6B shows a detailed view of the SRS backend 607, which includes a generic data service 609 in communication with an MPIO data processor microservice 611 (e.g., for collecting and processing data from PowerPath software received from a PowerPath management application running on the management appliance 601) and a switch data processor microservice 625 (e.g., for collecting and processing data from Connectrix or other switches interconnecting the set of servers 603). The MPIO data processor microservice 611 implements an MPIO data processor and API 613, as well as checkpoint detection logic 615 which is in communication with a diagnosis engine 617 that utilizes checkpoint status check logic 619, health prediction check logic 621 and database update logic 623. The switch data processor microservice 625 implements a switch data processor and API 627 in communication with a switch fabric inventory 629 and a data store of health predictions 631. The MPIO data processor and API 613 of the MPIO data processor microservice 611 is in communication with the switch data processor microservice 625. The MPIO data processor microservice 611 and the switch data processor microservice 625 are also in communication with a public API gateway 633 (e.g., a REST API gateway).

When the SRS backend 607 receives the health prediction check REST API call from the management appliance 601 via the public API gateway 633, the MPIO data processor microservice 611 uses its MPIO data processor and API 613 to trigger the checkpoint detection logic 615 to check each of the checkpoints of different paths between the servers 603. The checkpoint detection logic 615 in turn accesses the diagnosis engine 617 to invoke the checkpoint status check logic 619 (e.g., to check each of the checkpoints), the health prediction check logic 621 (e.g., to generate failure predictions for each of the SFP ports or other optic components in the paths between the servers 603), and the database update logic 623 (e.g., to update connection details including diagnoses for each of the paths between the servers 603). As part of this process, the MPIO data processor and API 613 may communicate with the switch data processor and API 627 to access the switch fabric inventory 629 (e.g., for checkpoint information for checkpoints involving switches interconnecting the servers 603) and the health predictions 631 (e.g., for SFP ports or other optic components of the switches interconnecting the servers 603).

Figure 7:
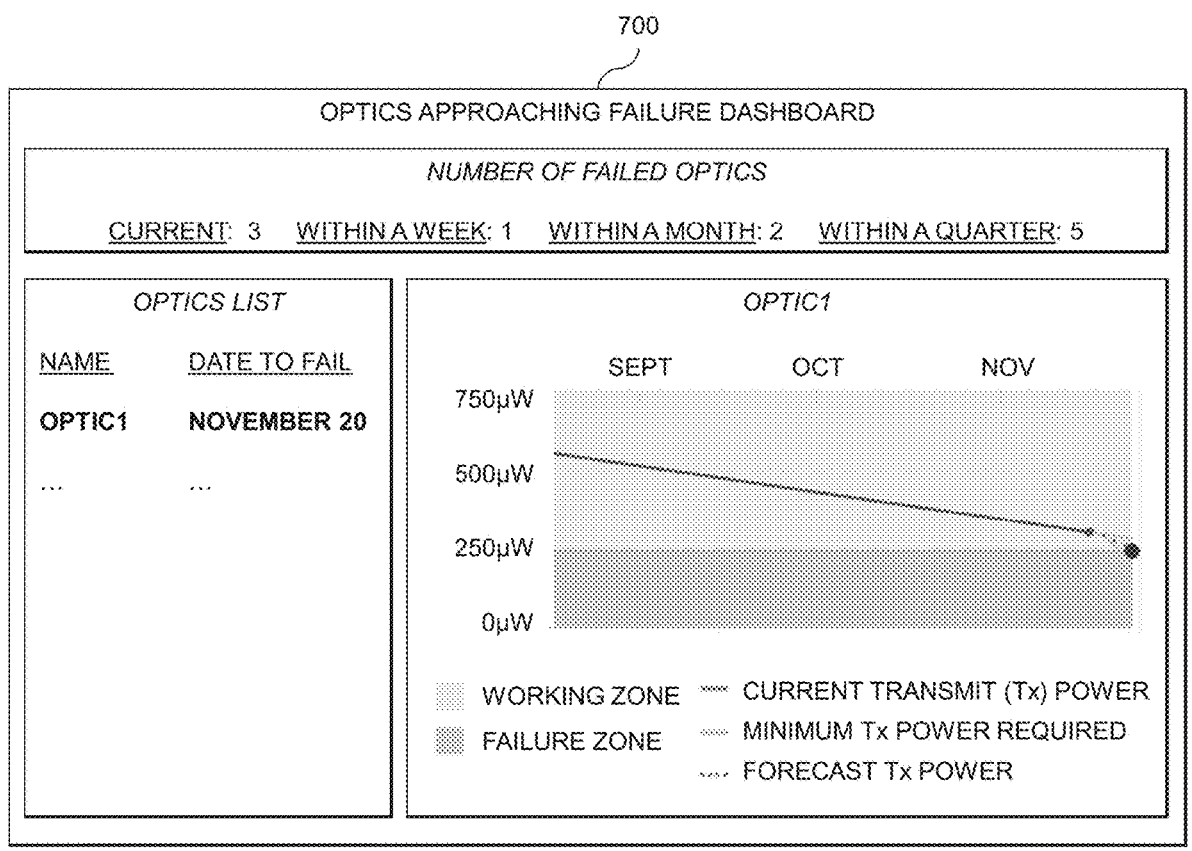
FIG. 7 shows an optics approaching failure dashboard in an illustrative embodiment.

FIG. 7 shows an example of a graphical user interface (GUI) dashboard 700 for optics approaching failure, which indicates numbers of failed optics (e.g., currently failing, as well as those predicted to fail within a week, a month and a quarter), a list of optics which may be selected, and visualization of the selected optic (e.g., including working and failure zones for that optic, current transmit (Tx) power, minimum Tx power required, and forecast Tx power). For example, the selected optic, Optic1, may by a port number FC0/7 belonging to a stretch cluster extension which is predicted to fail on November 20th.

Illustrative embodiments provide various advantages, including in the ability to proactively predict SFP or other port failures and make failover decisions for paths associated with such ports accordingly. In some cases, the paths may be put in a standby state, to avoid IO failures and IO retries on the paths associated with SFP ports which are predicted to fail. MPIO software, including MPIO management stations, may implement such proactive path state change functionality at least in part by leveraging cloud-based health status prediction algorithms.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for performing proactive path state changes for MPIO drivers will now be described in greater detail with reference to FIGS. 8 and 9. Although described in the context of system 100, these platforms may also be used to implement at least portions of other information processing systems in other embodiments. FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

Figure 8:
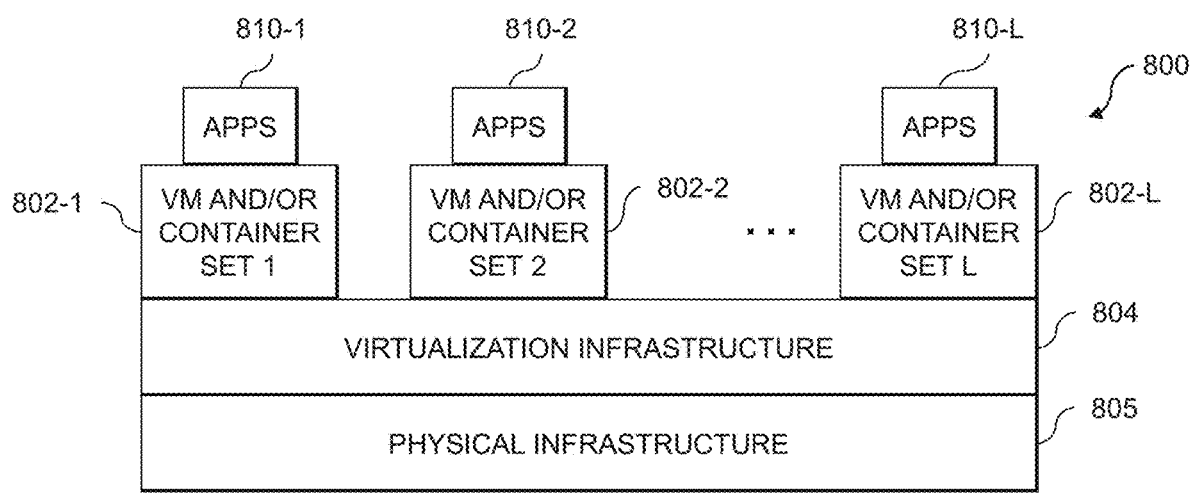
FIGS. 8 and 9 show examples of processing platforms that may be utilized to implement at least a portion of an information processing system in illustrative embodiments.
Figure 9:
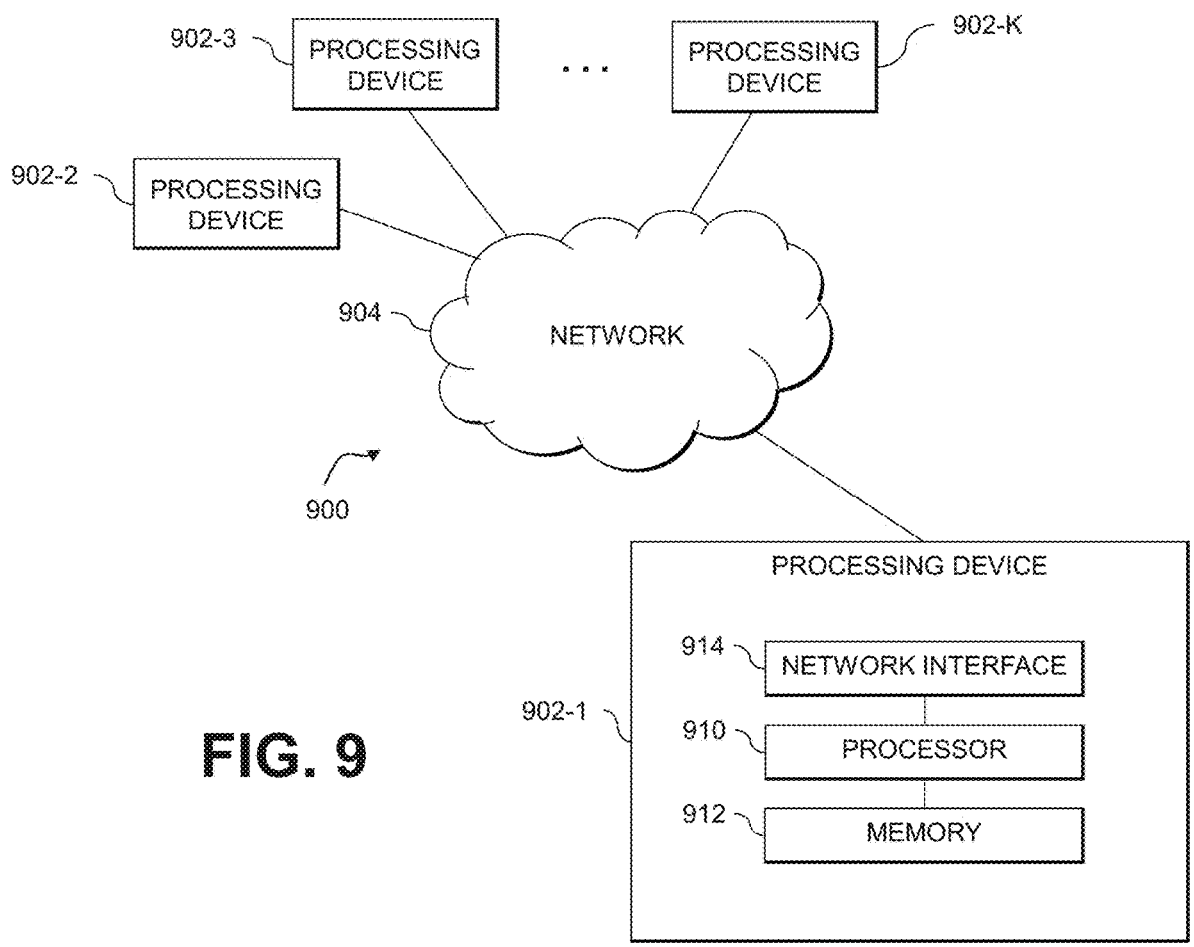

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for performing proactive path state changes for MPIO drivers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, proactive path state change logic, and additional or alternative components. Also, the particular configurations of system and device elements and associated processing operations illustratively shown in the drawings can be varied in other embodiments. For example, a wide variety of different host device and storage system configurations, and associated aligned path selection techniques, can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to identify, for a given path interconnecting a given host device and a storage system, a set of two or more checkpoints characterizing health of the given path;
   to generate health predictions for each checkpoint in the identified set of two or more checkpoints;
   to determine whether any of the generated health predictions indicates an expected date of failure within a designated period of time; and
   responsive to determining that at least one of the generated health predictions indicates an expected date of failure within the designated period of time, to proactively update a connection state of the given path in a given multi-path input-output driver of the given host device;
   wherein at least one checkpoint in the identified set of two or more checkpoints is associated with a given port used in the given path interconnecting the given host device and the storage system; and
   wherein the generated health prediction for the at least one checkpoint characterizes one or more predicted connection states associated with the given port.

2. The apparatus of claim 1 wherein the set of two or more checkpoints comprises an initiator host bus adapter port of the given host device, a target port of the storage system, and one or more switch ports interconnecting the initiator host bus adapter port of the given host device and the target port of the storage system.

3. The apparatus of claim 2 wherein the one or more switch ports interconnecting the initiator host bus adapter port of the given host device and the target port of the storage system comprises:
   a first switch port of a first switch that the initiator host bus adapter port of the given host device is connected to;
   a second switch port of a second switch that the target port of the storage system is connected to; and
   one or more inter-switch layer ports interconnecting the first switch and the second switch.

4. The apparatus of claim 1 wherein the at least one processing device comprises a management appliance configured to manage multi-path input-output drivers of a plurality of host devices, including the given host device, in a data center.

5. The apparatus of claim 4 wherein generating the health predictions for each of the checkpoints in the identified set of two or more checkpoints comprises:
   initiating a representational state transfer (REST) application programming interface (API) call to a server external to the data center, the REST API call specifying a first World Wide Name (WWN) identifier of an initiator host bus adapter port of the given host device and a second WWN identifier of a target port of the storage system for the given path; and
   receiving, from the server in response to the REST API call, health failure reports for each of the checkpoints in the identified set of two or more checkpoints.

6. The apparatus of claim 5 wherein the server external to the data center comprises a cloud-based storage analytics service.

7. The apparatus of claim 1 wherein proactively updating the connection state of the given path in the given multi-path input-output driver of the given host device comprises setting the connection state of the given path to a standby state.

8. The apparatus of claim 1 wherein proactively updating the connection state of the given path in the given multi-path input-output driver of the given host device comprises performing failover of the given path to at least one other path between the given host device and the storage system.

9. The apparatus of claim 1 wherein proactively updating the connection state of the given path in the given multi-path input-output driver of the given host device comprises setting the connection state of the given path to one which avoids input-output retries on the given path.

10. The apparatus of claim 1 wherein proactively updating the connection state of the given path in the given multi-path input-output driver of the given host device comprises setting the connection state of the given path to one which avoids input-output timeouts on the given path.

11. An apparatus comprising:
at least one processing device comprising a processor coupled to a memory;
the at least one processing device being configured:
to identify, for a given path interconnecting a given host device and a storage system, a set of two or more checkpoints characterizing health of the given path;
to generate health predictions for each checkpoint in the identified set of two or more checkpoints;
to determine whether any of the generated health predictions indicates an expected date of failure within a designated period of time; and
responsive to determining that at least one of the generated health predictions indicates an expected date of failure within the designated period of time, to proactively update a connection state of the given path in a given multi-path input-output driver of the given host device;
wherein the generated health prediction for a given one of the checkpoints in the identified set of two or more checkpoints comprises a failure prediction state of a given port used in the given path interconnecting the given host device and the storage system.

12. The apparatus of claim 11 wherein the failure prediction state is based at least in part on determining whether a forecast transmit power of the given port drops below a minimum transmit power required for the given port within the designated period of time.

13. The apparatus of claim 11 wherein the failure prediction state is based at least in part on determining whether a forecast transmit power of the given port transitions from a working zone to a failure zone within the designated period of time.

14. The apparatus of claim 11 wherein the given port comprises a Small Form Factor Pluggable (SFP) port.

15. A method comprising:
identifying, for a given path interconnecting a given host device and a storage system, a set of two or more checkpoints characterizing health of the given path;
generating health predictions for each checkpoint in the identified set of two or more checkpoints;
determining whether any of the generated health predictions indicates an expected date of failure within a designated period of time; and
responsive to determining that at least one of the generated health predictions indicates an expected date of failure within the designated period of time, proactively updating a connection state of the given path in a given multi-path input-output driver of the given host device;
wherein at least one checkpoint in the identified set of two or more checkpoints is associated with a given port used in the given path interconnecting the given host device and the storage system;
wherein the generated health prediction for the at least one checkpoint characterizes one or more predicted connection states associated with the given port; and
wherein the method is performed by at least one processing device comprising a processor coupled to a memory.

16. The method of claim 15 wherein the generated health prediction for the at least one checkpoint comprises a failure prediction state of the given port.

17. The method of claim 15 wherein proactively updating the connection state of the given path in the given multi-path input-output driver of the given host device comprises setting the connection state of the given path to a standby state.

18. A computer program product comprising a non-transitory processor-readable storage medium having stored therein program code of one or more software programs, wherein the program code when executed by at least one processing device causes the at least one processing device:
to identify, for a given path interconnecting a given one of a plurality of host devices and a storage system, a set of two or more checkpoints characterizing health of the given path;
to generate health predictions for each checkpoint in the identified set of two or more checkpoints;
to determine whether any of the generated health predictions indicates an expected date of failure within a designated period of time; and
responsive to determining that at least one of the generated health predictions indicates an expected date of failure within the designated period of time, to proactively update a connection state of the given path in a given multi-path input-output driver of the given host device;
wherein at least one checkpoint in the identified set of two or more checkpoints is associated with a given port used in the given path interconnecting the given host device and the storage system; and
wherein the generated health prediction for the at least one checkpoint characterizes one or more predicted connection states associated with the given port.

19. The computer program product of claim 18 wherein the generated health prediction for the at least one checkpoint comprises a failure prediction state of the given port.

20. The computer program product of claim 18 wherein proactively updating the connection state of the given path in the given multi-path input-output driver of the given host device comprises setting the connection state of the given path to a standby state.

* * * * *